United States Patent
Yim et al.

(10) Patent No.: US 8,582,891 B2
(45) Date of Patent: Nov. 12, 2013

(54) METHOD AND APPARATUS FOR GUIDING USER WITH SUITABLE COMPOSITION, AND DIGITAL PHOTOGRAPHING APPARATUS

(75) Inventors: Hyun-ock Yim, Seoul (KR); Ung-sik Kim, Suwon-si (KR); Ji-hyun Goh, Seongnam-si (KR); Won-seok Song, Anyang-si (KR); Myung-kyu Choi, Suwon-si (KR); Tae-hoon Kang, Seoul (KR); Eun-sun Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 601 days.

(21) Appl. No.: 12/822,344

(22) Filed: Jun. 24, 2010

(65) Prior Publication Data

US 2010/0329552 A1 Dec. 30, 2010

(30) Foreign Application Priority Data

Jun. 24, 2009 (KR) .................. 10-2009-0056532

(51) Int. Cl.
*G06K 9/62* (2006.01)
(52) U.S. Cl.
USPC ........... 382/201; 382/224; 382/227; 382/165; 345/594
(58) Field of Classification Search
USPC .................................. 382/224, 227, 190, 165
See application file for complete search history.

(56) References Cited

U.S. PATENT DOCUMENTS

| | | | | |
|---|---|---|---|---|
| 5,537,528 A * | 7/1996 | Takahashi et al. | ............ | 715/255 |
| 5,644,386 A * | 7/1997 | Jenkins et al. | ............... | 356/4.01 |
| 6,295,380 B1 * | 9/2001 | Takahashi | ..................... | 382/240 |
| 6,370,262 B1 * | 4/2002 | Kawabata | ..................... | 382/106 |
| 7,106,906 B2 * | 9/2006 | Iwamura | ..................... | 382/236 |
| 7,787,028 B2 * | 8/2010 | Kojo | ........................... | 348/239 |
| 8,250,623 B2 * | 8/2012 | Yabe et al. | ..................... | 725/151 |
| 2003/0028397 A1 * | 2/2003 | Tagashira et al. | ................. | 705/1 |
| 2005/0134933 A1 * | 6/2005 | Tsue et al. | ..................... | 358/437 |
| 2007/0067724 A1 * | 3/2007 | Takahashi et al. | ............ | 715/723 |
| 2008/0019594 A1 * | 1/2008 | Hiraizumi et al. | ............ | 382/190 |
| 2008/0267606 A1 * | 10/2008 | Wolcott et al. | ................ | 396/332 |
| 2009/0060352 A1 * | 3/2009 | Distante et al. | ............... | 382/224 |
| 2009/0268058 A1 * | 10/2009 | Hwang et al. | ............ | 348/231.99 |

FOREIGN PATENT DOCUMENTS

JP 2007-174548 A 7/2007

* cited by examiner

*Primary Examiner* — Vu Le
*Assistant Examiner* — Aklilu Woldemariam
(74) *Attorney, Agent, or Firm* — Drinker Biddle & Reath LLP

(57) ABSTRACT

A method for guiding a user with a suitable composition includes detecting scene information from an input image, recognizing a scene of the input image by using the detected scene information, extracting composition information corresponding to the recognized scene, and displaying the extracted composition information. Accordingly, an apparatus for guiding a user with a suitable composition and a digital photographing apparatus using the method displays a composition suitable for a current scene by automatically recognizing the current scene, so that the user photographs the current scene quickly and easily.

20 Claims, 10 Drawing Sheets

METHOD AND APPARATUS FOR GUIDING USER WITH SUITABLE COMPOSITION, AND DIGITAL PHOTOGRAPHING APPARATUS

RELATED APPLICATIONS

This application claims the priority benefit of Korean Patent Application No. 10-2009-0056532, filed on Jun. 24, 2009, in the Korean Intellectual Property Office, the disclosure of which is incorporated herein in its entirety by reference.

BACKGROUND

1. Field

One or more embodiments relate to controlling photographing, and more particularly, to a method and apparatus for guiding a user with a suitable composition of an image to be captured, and a digital photographing apparatus.

2. Description of the Related Art

A photographer may choose a composition, i.e., how to organize compositions on a screen. In order to form a suitable composition, a screen organization may be synthetically considered, such as a line, a shape, a hue, brightness, texture, weight on a main subject and peripheral elements, a distance, a direction, and a motion status.

As disclosed in JP 2007-174548, when a user selects a scene to be photographed in a scene mode, a main subject is determined according to the selected scene. An outline of the determined main subject is extracted and compared with data stored in a composition database, thereby guiding the user via a display device on a location to change the main subject based on information in the composition database.

In such a technology of guiding a user with a suitable composition, the user selects a scene, and thus changes a mode. Specifically, when the user immediately captures an image without changing a current mode that is different from a current photographing circumstance, a wrong subject may be recognized as a main subject. In this case, the user has to change the current mode, and thus may miss a photographing moment. Also, since a composition is set only based on the main subject, a suitable composition may be difficult to be set when there are a plurality of subjects.

SUMMARY

One or more embodiments include a method and apparatus for guiding a user with a suitable composition of an image to be captured, wherein analysis information is extracted from received image data and a composition most suitable for scene recognition information and subject information is automatically suggested so as to overlap and display a received scene and the composition on a screen, so that a user effectively expresses the intention and elements to be photographed by applying the suggested composition to an arrangement of subjects to be photographed.

One or more embodiments include a digital photographing apparatus including a composition guiding function.

Additional aspects will be set forth in part in the description which follows and, in part, will be apparent from the description, or may be learned by practice of the presented embodiments.

According to one or more embodiments, a method of guiding a user with a suitable composition includes: detecting scene information from an input image; recognizing a scene of the input image by using the detected scene information; extracting composition information corresponding to the recognized scene; and displaying the extracted composition information.

In the extracting, at least one piece of composition information suitable for the recognized scene may be extracted from compositions stored in a predetermined composition database.

The method may further include analyzing feature information of the input image, wherein, in the extracting, composition information according to the recognized scene may be extracted based on the analyzed feature information.

The method may further include displaying a composition menu corresponding to the extracted at least one piece of composition information, wherein, in the displaying of the composition menu, a composition selected by the user from the displayed composition menu may be displayed with the input image.

In the displaying of the composition menu, a description about the selected composition may be also displayed.

The method may further include providing to the user composition guide information for capturing the input image.

At least one selected from the group consisting of a composition according to the recognized scene and a grid may be displayed with the input image, according to a selection of the user.

The method may further include displaying a scene icon corresponding to the recognized scene.

When the input image is captured and recorded, corresponding composition information may be added to an exchangeable image file (Exif) of the input image as metadata.

When the recorded input image is reproduced, the composition information may be displayed with the input image.

The feature information may include at least one selected from the group consisting of brightness, exposure, auto focus (AF) focus distance, histograms, color information according to time, subject information, and scene recognizing information.

According to one or more embodiments, an apparatus for guiding a user with a suitable composition includes: a scene information detector that detects scene information from an input image; a scene recognizer that recognizes a scene of the input image by using the detected scene information; and a controller that extracts composition information according to the recognized scene and displays the extracted composition information.

The controller may extract at least one piece of composition information suitable for the recognized scene from compositions stored in a predetermined composition database.

The apparatus may further include an image information analyzer that analyzes feature information of the input image, wherein the controller may extract composition information according to the recognized scene based on the feature information.

The controller may display a composition menu corresponding to the extracted at least one piece of composition information, and display a composition selected by the user by using the composition menu with the input image.

The controller may provide composition guide information for capturing the input image to the user, and display at least one selected from the group consisting of a composition according to the recognized scene and a grid with the input image, according to a selection of the user.

The controller may add corresponding composition information to an exchangeable image file (Exif) of the input image as metadata, when the input image is captured and recorded, and display the composition information with the input image, when the recorded input image is reproduced.

The feature information may include at least one selected from the group consisting of brightness, exposure, auto focus (AF) focus distance, histograms, color information according to time, subject information, and scene recognizing information.

According to one or more embodiments, a digital photographing apparatus includes the apparatus for guiding a user with a suitable composition.

According to one or more embodiments, a non-transitory computer readable storage medium has stored thereon a program executable by a processor for performing the method.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings. Also, while describing the embodiments, detailed descriptions about related well-known functions or configurations that may diminish the clarity of the points of the embodiments are omitted.

Terms or words used herein shall not be limited to having common or dictionary meanings, and have the meanings corresponding to technical aspects of the embodiments so as to most suitably express the embodiments.

Figure 1:
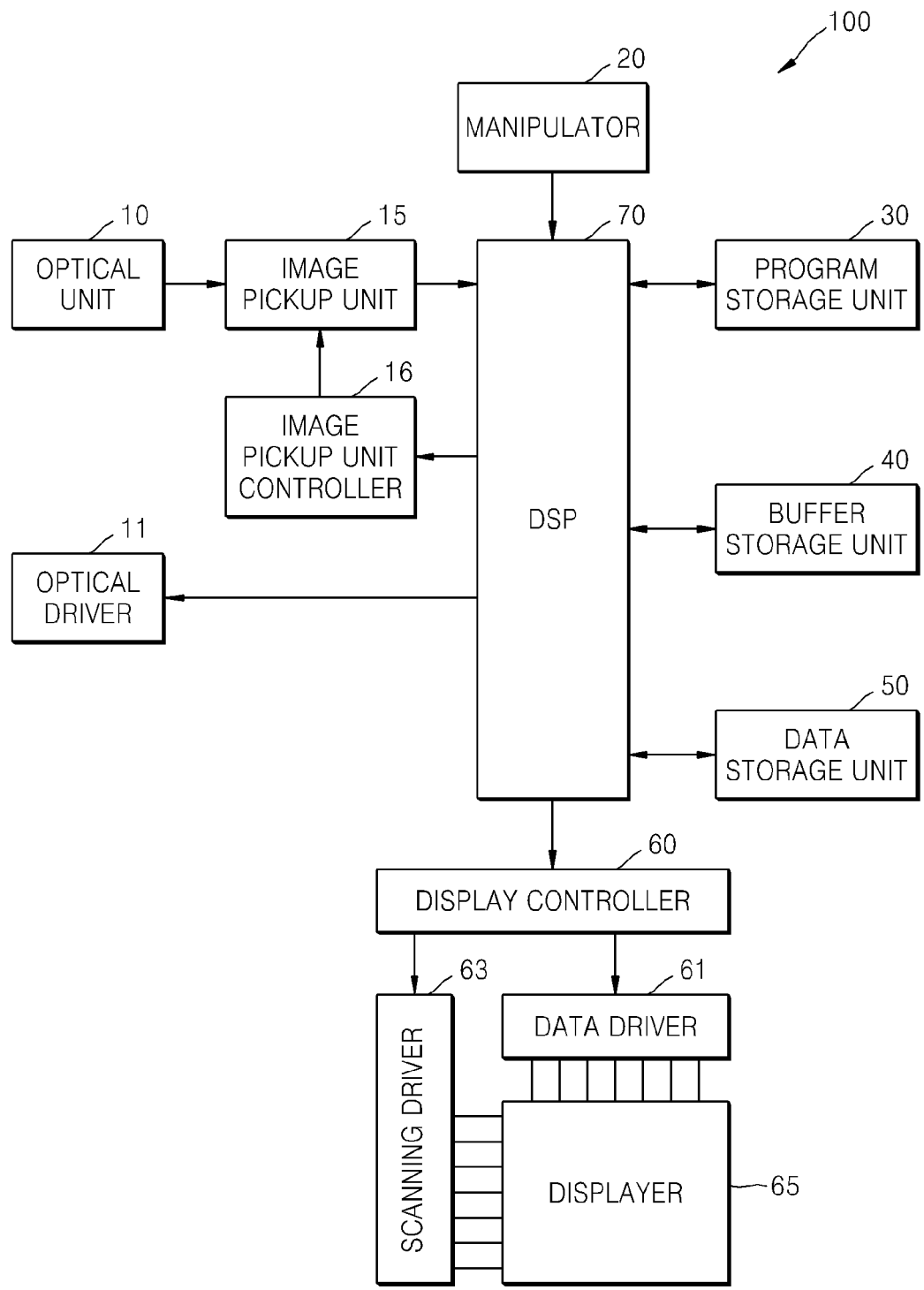
FIG. 1 is a block diagram schematically illustrating a digital camera, as an example of a digital photographing apparatus, according to an embodiment.
Figure 2:
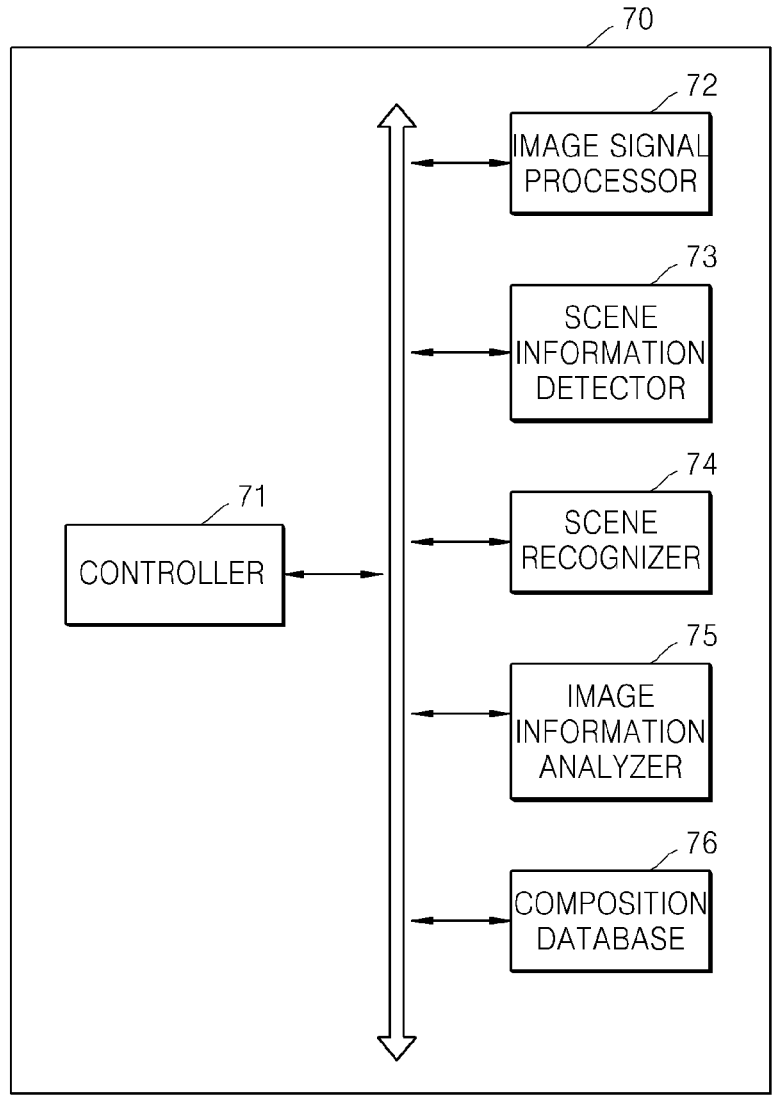
FIG. 2 is a block diagram illustrating in detail a digital signal processor of FIG. 1.

FIG. 1 is a block diagram schematically illustrating a digital camera 100, as an example of a digital photographing apparatus, according to an embodiment, and FIG. 2 is a block diagram illustrating in detail a digital signal processor (DSP) 70 of FIG. 1.

Referring to FIG. 1, the digital camera 100 includes an optical unit 10, an optical driver 11, an image pickup unit 15, an image pickup unit controller 16, a manipulator 20, a program storage unit 30, a buffer storage unit 40, a data storage unit 50, a display controller 60, a data driver 61, a scanning driver 63, a displayer 65, and the DSP 70.

The optical unit 10 receives an optical signal from a subject, and transmits the optical signal to the image pickup unit 15. The optical unit 10 may include at least one lens, such as a zoom lens for narrowing or widening a viewing angle according to a focal length, or a focus lens for adjusting a focus on the subject. The optical unit 10 may further include an iris for adjusting light intensity.

The optical driver 11 adjusts a location of the at least one lens or the opening and closing of the iris. A focus may be adjusted by moving the location of the at least one lens, and light intensity may be adjusted by opening and closing the iris. The optical driver 11 controls the optical unit 10 according to a control signal that is automatically generated by an image signal input in real time or that is manually input by a user.

The optical signal transmitted from the optical unit 10 to the image pickup unit 15 forms an image of the subject on a light-receiving surface of the image pickup unit 15. The image pickup unit 15 may include a charge-coupled device (CCD) or a complementary metal oxide semiconductor image sensor (CIS) that converts the optical signal into an electric signal. The image pickup unit controller 16 may adjust sensitivity or the like of the image pickup unit 15. The image pickup unit controller 16 may control the image pickup unit 15 according to a control signal that is automatically generated by an image signal input in real time or that is manually input by the user.

The manipulator 20 may receive a control signal from the outside of the digital camera 100, such as from the user. The manipulator 20 may include a shutter-release button that can be pressed to generate a shutter-release signal to capture an image by exposing the image pickup unit 15 to light for a predetermined time, a power supply button that can be pressed to supply power to the digital camera 100, a pantoscopic-zoom button and a telescopic-zoom button that can be pressed to widen or narrow a viewing angle, and other buttons that can be pressed to perform various functions, such as selecting a mode like a character inputting mode, a photographing mode, a reproduction mode, selecting a white balance setting function, and selecting an exposure setting function. The manipulator 20 may include various buttons as described above, but is not limited thereto, and may be realized in various forms that can be manipulated by the user, such as a keyboard, a touch pad, a touch screen, or a remote controller.

Also, the digital camera 100 further includes the program storage unit 30 for storing a program such as an operating system for operating the digital camera 100 or an application system, the buffer storage unit 40 for temporarily storing data used during operation or result data of the operation, and the data storage unit 50 for storing various types of information required for a program, including an image file and an image signal.

Moreover, the digital camera 100 includes the display controller 60 for displaying an operating status of the digital camera 100 or an image captured by the digital camera 100, the data driver 61 and the scanning driver 63 for transmitting display data received from the display controller 60, and the displayer 65 for displaying a predetermined image according to a signal received from the data driver 61 and the scanning driver 63. The displayer 65 may be formed of a liquid crystal display (LCD) panel, an organic light emitting display (OLED) panel, or an electrophoresis display (EPD) panel.

Also, the displayer 65 displays a scene to which an input image, such as a preview image, corresponds using a certain scene icon, according to the control of the DSP 70. The displayer 65 also displays composition icons corresponding to compositions suitable for the input image. Also, the displayer 65 displays a representative composition, a lattice, or both of the representative composition and the lattice with the input image so as to guide the user with a suitable composition.

The digital camera 100 includes the DSP 70 for processing a received image signal, and controlling each element according to the received image signal or an external input signal.

The DSP 70 will now be described in detail with reference to FIG. 2.

Referring to FIG. 2, the DSP 70 includes a controller 71, an image signal processor 72, a scene information detector 73, a scene recognizer 74, an image information analyzer 75, and a composition database 76. Here, the DSP 70 may include an apparatus for guiding a user with a suitable composition.

The controller 71 controls overall operations of the DSP 70.

The image signal processor 72 converts an image signal received from the image pickup unit 15 into a digital signal, and performs an image signal process, such as gamma correction, color filter array interpolation, color matrix, color correction, or color enhancement, so that the image signal is converted according to the visual angle to a person. Also, the image signal processor 72 may perform an auto white balance algorithm or an auto exposure algorithm, when an auto white balance function or auto exposure function is set. The image signal processor 72 generates an image file having a predetermined format by adjusting and compressing a size of image data with a scaler. Alternatively, the image signal processor 72 decompresses a compressed image file. The image signal processor 72 may perform the image signal process as above on an image signal received in real time in a live-view mode before photographing, or an image signal received by a shutter-release signal. Here, a different image signal process may be performed on each image signal.

The scene information detector 73 detects scene information of an input image. Here, the input image denotes an image received through the digital camera 100, and a preview image before taking a photograph. Also, the scene information denotes information indicating features of a corresponding scene. For example, the scene information may include a face of a person in the input image, the brightness of the input image, the illuminance of a subject, or a distance of the subject. The scene information detector 73 detects the face using a face detecting module (not shown) or detects the scene information by measuring the illuminance of the subject. Also, the scene information detector 73 may also detect the scene information by using a related scene detecting or analyzing method.

The scene recognizer 74 determines the scene of the input image by using the detected scene information. By determining the scene, the scene recognizer 74 determines whether the input image is an image of a person or scenery, an image of a person or scenery taken at night, an image taken against the light, or the like. In other words, the scene recognizer 74 determines the input image as an image of a person when scene information including a face of a person is detected, determines whether the input image has been taken against the light based on an illuminance value of a subject, and determines whether the input image has been taken at night based on a brightness value of the input image. Also, the scene recognizer 74 may also recognize the scene information by using a related scene detecting or analyzing method.

The controller 71 extracts composition information according to a scene, such as a scenery, a night view, or a backlight, recognized by the scene recognizer 74, from the composition database 76. Here, the composition information generally denotes an arrangement of subjects, and includes a circular composition, a triangular composition, a diagonal composition, a golden sectional composition, a radial composition, an S-shaped composition, a parallel lined composition, a tri-sectional composition, a checker composition, a horizontal and perpendicular composition, and other compositions set by the user.

Also, the controller 71 extracts at least one composition suitable for a scene of the input image from among the compositions stored in the composition database 76, and displays the extracted composition on the displayer 65 via the display controller 60. Here, when a plurality of compositions are displayed, the compositions may be displayed according to a preference of the user. Accordingly, the user may select the composition to be photographed.

The image information analyzer 75 analyzes feature information of the input image. Here, the feature information includes brightness, exposure, AF focus distance, histograms, color information according to time, subject information, and scene recognizing information.

Based on the feature information received from the image information analyzer 75, the controller 71 extracts an optimum composition for the scene from the composition database 76, and displays the optimum composition.

The composition database 76 stores compositions used while capturing an image, such as a circular composition, a triangular composition, a diagonal composition, a golden sectional composition, a radial composition, an S-shaped composition, a parallel lined composition, a tri-sectional composition, a checker composition, a horizontal and perpendicular composition, and other compositions set by the user.

Figure 3:
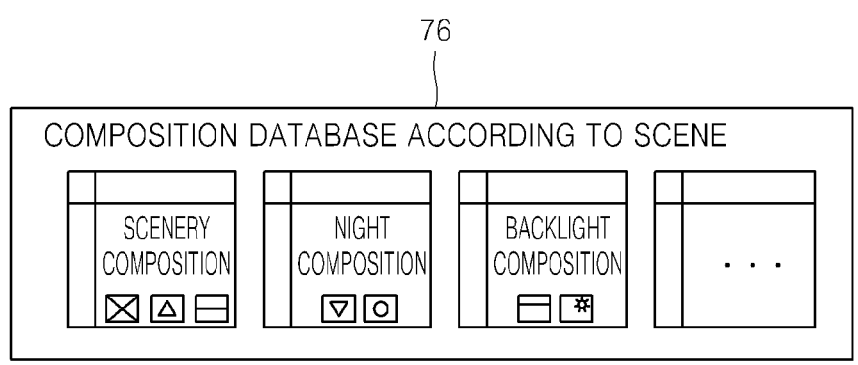
FIG. 3 is a diagram for describing composition information stored in a composition database of FIG. 2.

FIG. 3 is a diagram for describing composition information stored in the composition database 76 of FIG. 2. The composition database 76 stores compositions according to a scene, such as a scenery composition, a night composition, and a backlight composition. As illustrated in FIG. 3, the scenery composition includes a diagonal composition, a triangular composition, and a parallel lined composition, the night composition includes an inverted triangular composition and a circular composition, and the backlight composition includes a parallel lined composition and a backlight composition. The composition database 76 stores compositions suitable for each scene, and may store a brief description about each composition, for example, the feeling of a composition using text.

In the current embodiment, the composition database 76 is included in the DSP 70; however the present embodiment is not limited thereto, and the composition database 76 may be included in the data storage unit 50 of FIG. 1.

FIGS. 4A through 4D are diagrams for describing a method of guiding a user with a suitable composition, according to an embodiment.

Figure 4A:
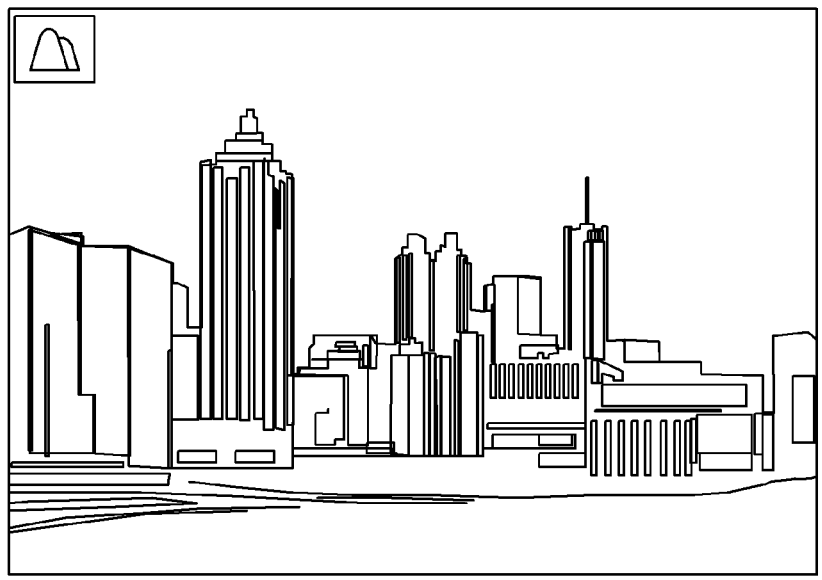
FIGS. 4A through 4D are diagrams for describing a method of guiding a user with a suitable composition, according to an embodiment.

Referring to FIG. 4A, the scene recognizer 74 recognizes a current input image as a scenery, and the controller 71 displays a scene icon including scenery on the upper left of the screen.

Figure 4B:

Referring to FIGS. 3 and 4B, the controller 71 extracts scenery compositions stored in the composition database 76 by using feature information of the current input image received from the image information analyzer 75 and scene information received from the scene recognizer 74. Here, a diagonal composition, a triangular composition and a parallel lined composition are extracted from several of the scenery compositions, and are displayed in a particular order. Alternatively, the optimum composition, such as the diagonal composition, for the current condition, i.e., the feature information and the scene information, may be selectively displayed on the screen.

Figure 4C:
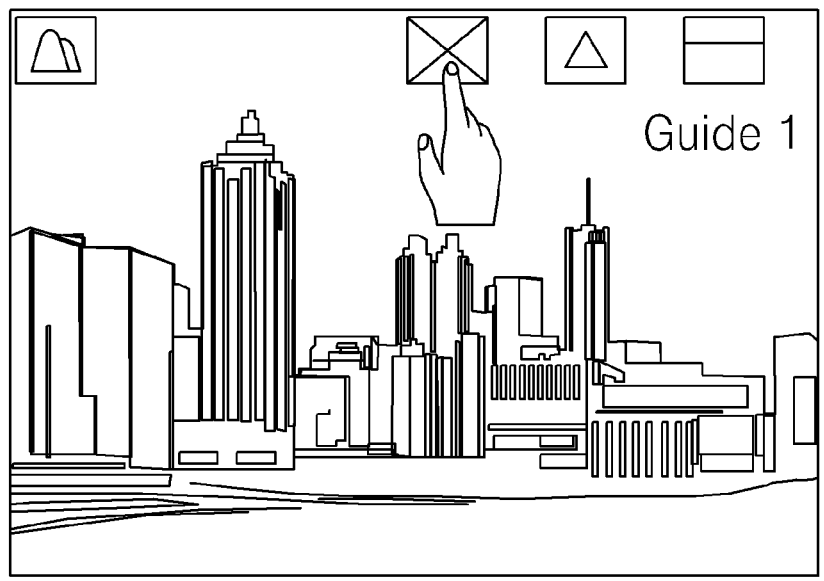
Figure 4D:
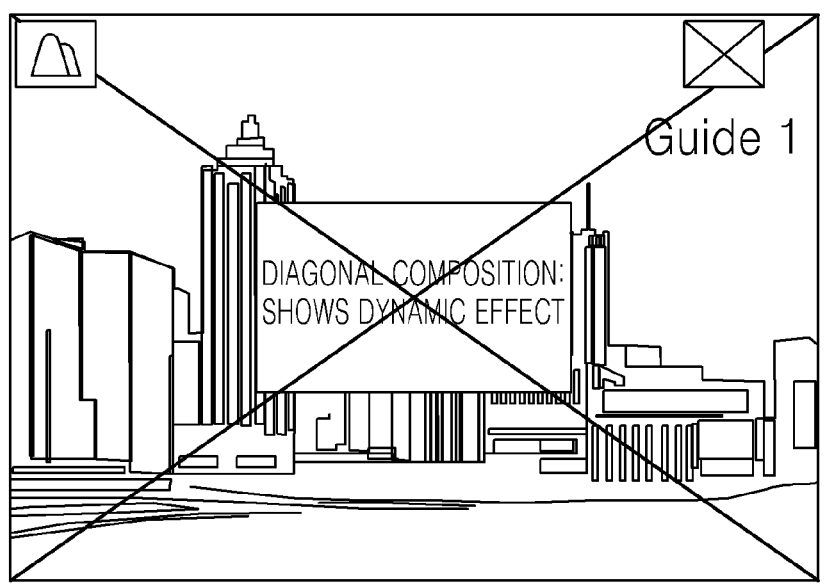

Referring to FIGS. 4C and 4D, the controller 71 may display the scenery compositions in certain composition icons. When the user selects a composition, such as the diagonal composition, from among the displayed scenery compositions, the selected composition (e.g., the diagonal composition) is displayed with the input image. Also, as shown in FIG. 4D, a brief description about the selected composition may be displayed with text, such as "Diagonal composition: Shows dynamic effect". The text automatically disappears after a predetermined time, and only the diagonal composition and the input image are displayed on the screen.

According to an embodiment, only one optimum composition may be displayed according to the feature information and scene information, or several compositions suitable for the feature information and scene information may be displayed for the user to select one composition.

Figure 5A:
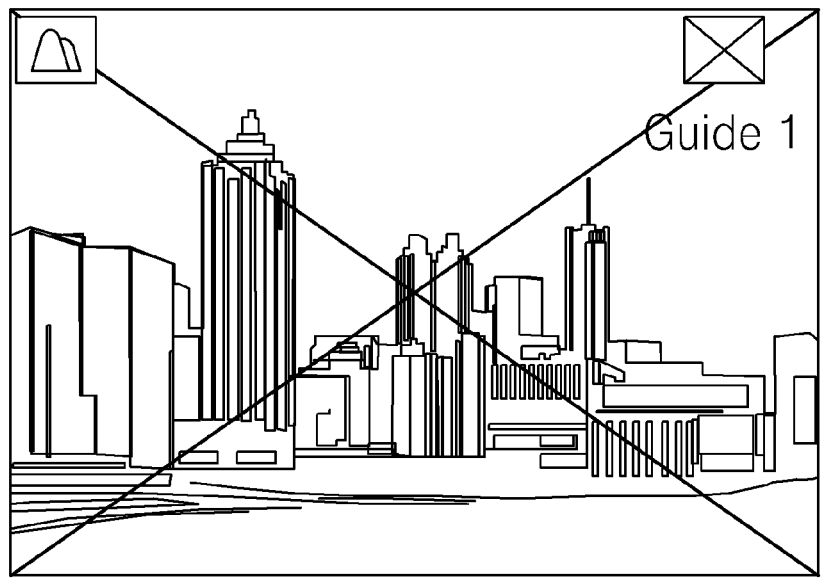
FIGS. 5A through 5C are diagrams for describing a method of guiding a user with a suitable composition, according to another embodiment.
Figure 5B:
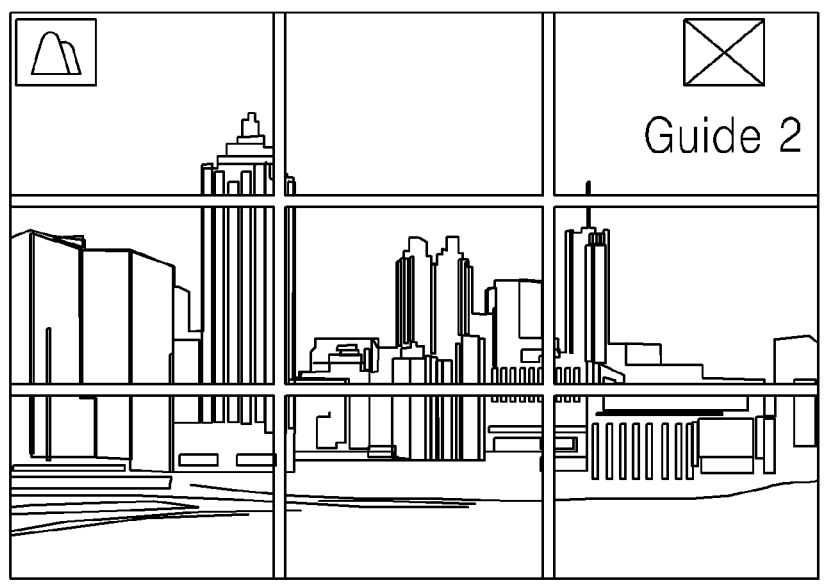
Figure 5C:
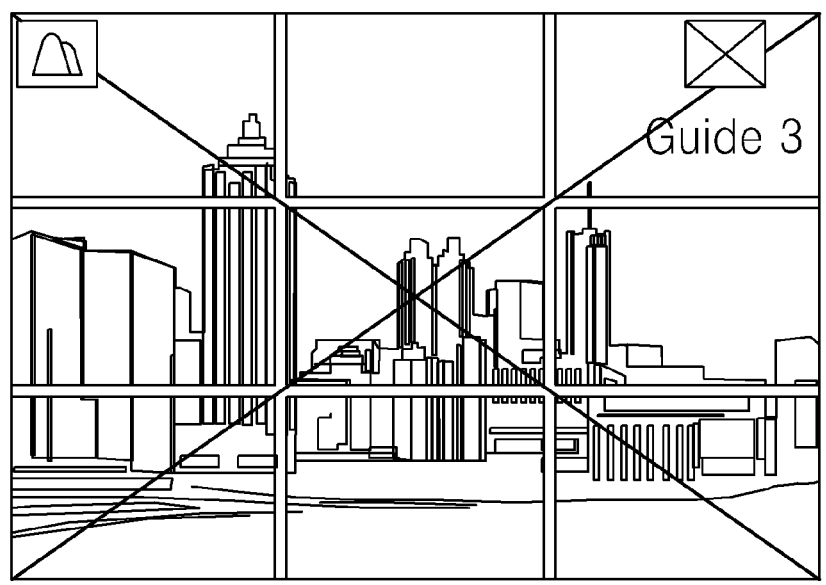

FIGS. 5A through 5C are diagrams for describing a method of guiding a user with a suitable composition, according to another embodiment.

Referring to FIGS. 5A through 5C, a menu for selecting a guiding method is provided. Here, in the guiding method, guide 1 displays a representative composition, i.e., a composition that is selected by a user from among extracted or recommended optimum compositions, with an input image, guide 2 displays a lattice or a grid, and guide 3 displays the representative composition with a lattice.

Figure 6A:
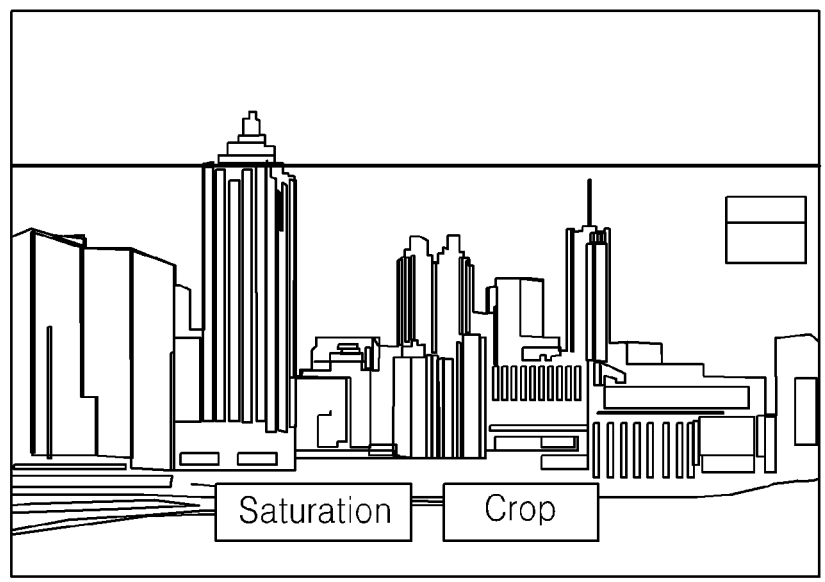
FIGS. 6A and 6B are diagrams for describing a method of guiding a user with a suitable composition, according to another embodiment.
Figure 6B:
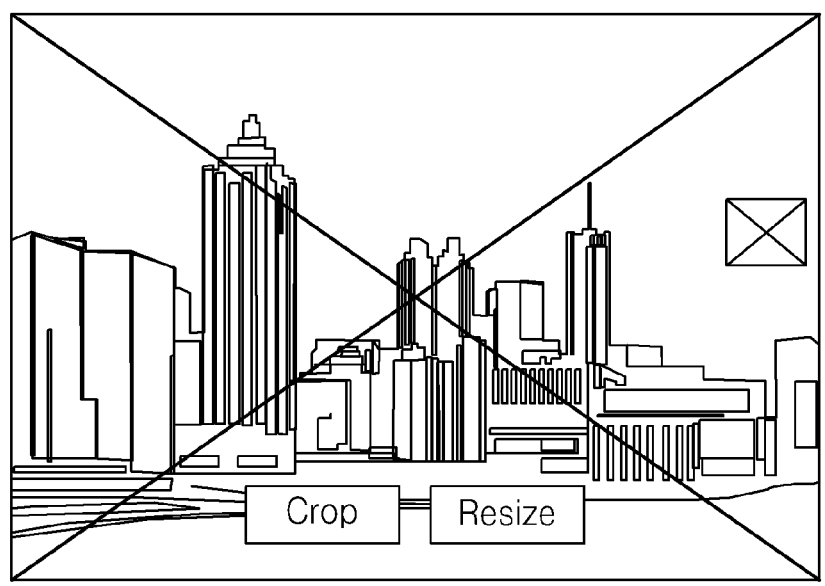

FIGS. 6A and 6B are diagrams for describing a method of guiding a user with a suitable composition, according to another embodiment. When an image is captured according to a displayed composition, the controller 71 adds information about the displayed composition as metadata, in an exchangeable image file (Exif) of the image. In other words, a status of the composition of the image that is captured is stored in the Exif, and when the image is reproduced in a playback mode later, the composition stored in the Exif may be used to display the image, as shown in FIG. 6A or 6B. In other words, when the image captured using a composition is displayed in a playback mode, the composition stored in the Exif is added to the displayed image, so that the composition used by the user is immediately determined. Also, an order of displaying image editing functions may be determined according to a composition, and image editing functions that are mainly used may be preferentially displayed according to a used composition, as shown in FIGS. 6A and 6B, so that the user may use the image editing functions quickly and easily.

Accordingly, a beginner may easily and clearly photograph a subject and show intention of photographing the subject in a standard mode, i.e., by using a recommended composition, and an expert may capture an image in detail by selecting an expansion mode so as to select one of a plurality of recommended compositions. Also, the user may selectively register a new composition so as to improve an intention of an image captured by the user, and information about a composition used while capturing an image may be recorded. Accordingly, a photographing pattern of the user may be analyzed and the result of photographing an image may be improved.

Figure 7:
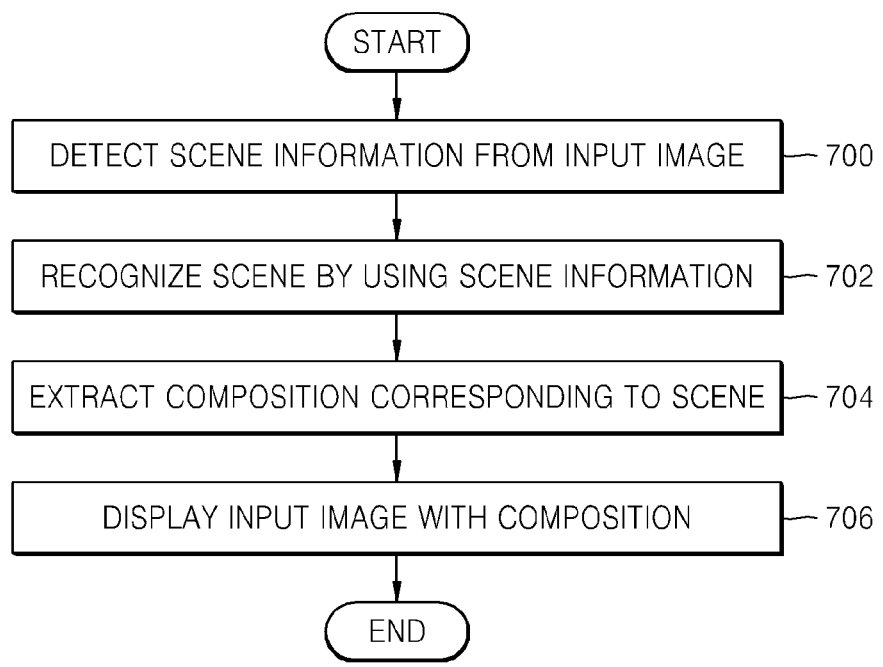
FIG. 7 is a flowchart illustrating a method of guiding a user with a suitable composition, according to an embodiment.

FIG. 7 is a flowchart illustrating a method of guiding a user with a suitable composition, according to an embodiment.

In operation 700, scene information is detected from an input image. In operation 702, a scene is recognized by using the scene information, whether the input image is an image of a scenery, a person, or a night view is determined. In operation 704, a composition corresponding to the recognized scene is extracted. Here, only one composition corresponding to the scene may be extracted, or several compositions corresponding to the scene may be extracted according to a particular order, such as preference or photographing frequency. In operation 706, the input image is displayed with the extracted composition.

Figure 8A:
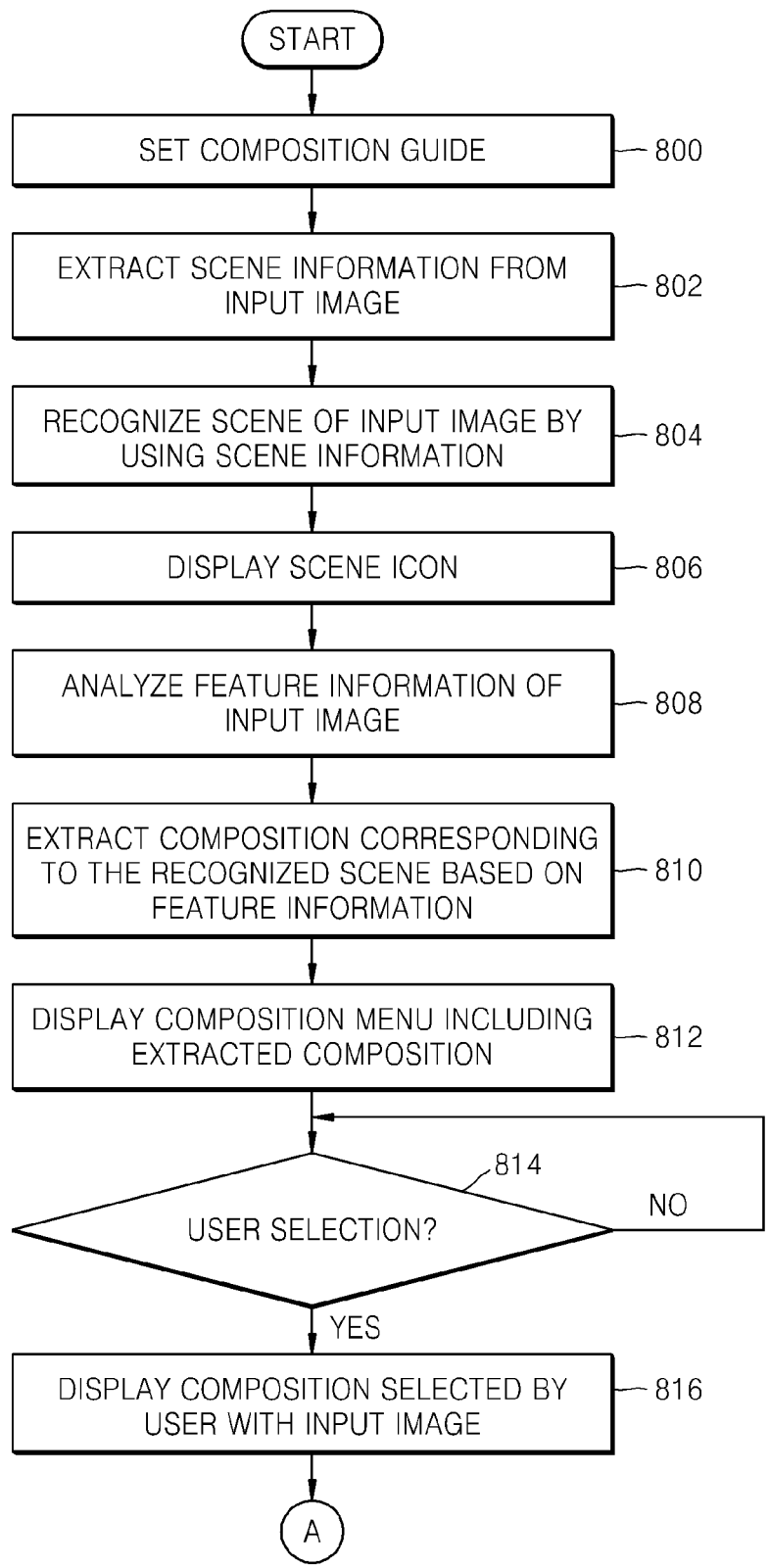
FIGS. 8A and 8B are a flowchart illustrating a method of guiding a user with a suitable composition, according to another embodiment.
Figure 8B:
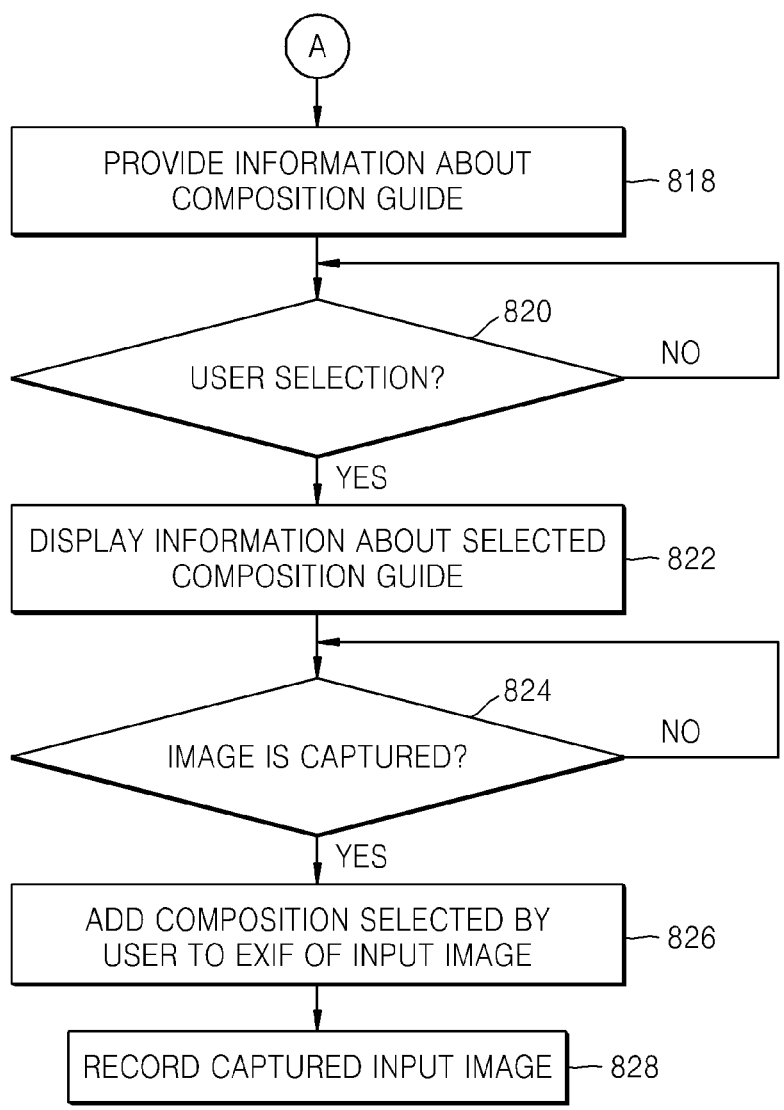

FIGS. 8A and 8B are a flowchart illustrating a method of guiding a user with a suitable composition, according to another embodiment.

Referring to FIG. 8A, a composition guide is set in operation 800. In operation 802, scene information is extracted from an input image. In operation 804, a scene of the input image is recognized using the scene information. In operation 806, a scene icon is displayed.

In operation 808, feature information of the input image is analyzed, and in operation 810, a composition corresponding to the recognized scene is extracted based on the feature information. In operation 812, a composition menu including the extracted composition is displayed. In operation 814, whether there is a user selection is determined. If it is determined that the user selected a certain composition in operation 814, the input image is displayed with the selected composition in operation 816.

Referring to FIG. 8B, in operation 818, information about a composition guide is provided. In operation 820, whether there is a user selection is determined. If it is determined that a user selected a certain composition guide in operation 820, information about the selected composition guide is displayed in operation 822.

When the input image is captured in operation 824, the composition selected by the user is added to an Exif of the input image in operation 826. In operation 828, the captured input image is recorded.

According to the method of guiding a user with a suitable composition, analysis information is extracted from received image data, and a composition most suitable for a scene recognizing information and subject information is automatically suggested, so as to overlap and display a received scene and the composition. Accordingly, a user can effectively represent a photographing intention and subjects by applying the composition on an arrangement of the subjects.

Also, a digital photographing apparatus using the method automatically recognizes a scene and displays a suitable composition corresponding to the scene, and thus a user can quickly and easily capture an image.

The above embodiments are described with respect to a digital camera, which is an example of a photographing apparatus, but the embodiments also apply to a camera phone having a camera function, a personal digital assistant (PDA), and a portable multimedia player (PMP).

Embodiments may include software modules which may be recorded and stored as program instructions or computer readable codes executable by a processor on non-transitory computer readable storage media such as read-only memory (ROM), random-access memory (RAM), CD-ROMs, magnetic tapes, floppy disks, and optical data storage devices. The computer readable storage medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art. Descriptions of features or aspects within each embodiment should typically be considered as available for other similar features or aspects in other embodiments.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. It will be recognized that the terms "comprising," "including," and "having," as used herein, are specifically intended to be read as open-ended terms of art. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

What is claimed is:

1. A method of guiding a user with a suitable composition of an image to be captured, the method comprising:
    detecting scene information from an input image, wherein the detected scene information includes at least one of a face, brightness of the input image, illuminance of a subject of the input image, and focus distance;
    using the detected scene information to determine a scene type of the input image, wherein the determined scene type of the input image includes at least one of scenery, a person, a night view, or a backlit image;
    extracting from a composition database composition information corresponding to the determined scene type; and
    displaying the input image and the extracted composition information.

2. The method of claim 1, wherein, in the extracting, at least one piece of composition information suitable for the determined scene type is extracted from compositions stored in a predetermined composition database.

3. The method of claim 2, further comprising:
    analyzing feature information of the input image,
    wherein, in the extracting, composition information according to the determined scene type is extracted based on the analyzed feature information.

4. The method of claim 2, further comprising:
    displaying a composition menu corresponding to the extracted at least one piece of composition information,
    wherein, in the displaying of the composition menu, a composition selected by the user from the displayed composition menu is displayed with the input image.

5. The method of claim 4, wherein, in the displaying of the composition menu, a description about the selected composition is also displayed.

6. The method of claim 2, further comprising providing to the user composition guide information for capturing the input image.

7. The method of claim 6, wherein at least one selected from the group consisting of a composition according to the determined scene type and a grid is displayed with the input image, according to a selection of the user.

8. The method of claim 2, further comprising displaying a scene icon corresponding to the determined scene type.

9. The method of claim 2, wherein, when the input image is captured and recorded, corresponding composition information is added to an exchangeable image file (Exif) of the input image as metadata.

10. The method of claim 9, wherein, when the recorded input image is reproduced, the composition information is displayed with the input image.

11. The method of claim 3, wherein the feature information comprises at least one selected from the group consisting of brightness, exposure, auto focus (AF) focus distance, histograms, color information according to time, subject information, and scene recognizing information.

12. A non-transitory computer readable storage medium having stored thereon a program executable by a processor for performing a method of guiding a user with a suitable composition of an image to be captured, the method comprising:
    detecting scene information from an input image, wherein the detected scene information includes at least one of a face, brightness of the input image, illuminance of a subject of the input image, and focus distance;

using the detected scene information to determine a scene type of the input image, wherein the determined scene type of the input image includes at least one of scenery, a person, a night view, or a backlit image;

extracting from a composition database composition information corresponding to the determined the scene type; and displaying the input image and the extracted composition information.

13. An apparatus for guiding a user with a suitable composition of an image to be captured, the apparatus comprising:

a scene information detector that detects scene information from an input image, wherein the detected scene information includes at least one of a face, brightness of the input image, illuminance of a subject of the input image, and focus distance;

a scene recognizer that uses the detected scene information to determine a scene type of the input image, wherein the determined scene type of the input image includes at least one of scenery, a person, a night view, or a backlit image; and a controller that extracts from composition database composition information according to the determined scene type and displays the input image and the extracted composition information.

14. The apparatus of claim 13, wherein the controller extracts at least one piece of composition information suitable for the recognized scene from compositions stored in a predetermined composition database.

15. The apparatus of claim 14, further comprising:

an image information analyzer that analyzes feature information of the input image, wherein the controller extracts composition information according to the determined scene type based on the feature information.

16. The apparatus of claim 14, wherein the controller displays a composition menu corresponding to the extracted at least one piece of composition information, and displays a composition selected by the user by using the composition menu with the input image.

17. The apparatus of claim 14, wherein the controller provides composition guide information for capturing the input image to the user, and displays at least one selected from the group consisting of a composition according to the determined scene type and a grid with the input image, according to a selection of the user.

18. The apparatus of claim 14, wherein the controller adds corresponding composition information to an exchangeable image file (Exif) of the input image as metadata, when the input image is captured and recorded, and displays the composition information with the input image, when the recorded input image is reproduced.

19. The apparatus of claim 15, wherein the feature information comprises at least one selected from the group consisting of brightness, exposure, auto focus (AF) focus distance, histograms, color information according to time, subject information, and scene recognizing information.

20. A digital photographing apparatus comprising:

an apparatus for guiding a user with a suitable composition of an image to be captured, the apparatus for guiding the user comprising:

a scene information detector that detects scene information from an input image, wherein the detected scene information includes at least one of a face, brightness of the input image, illuminance of a subject of the input image, and focus distance;

a scene recognizer that uses the detected scene information to determine a scene type of the input image, wherein the determined scene type of the input image includes at least one of scenery, a person, a night view, or a backlit image; and a controller that extracts from a composition database composition information according to the determined scene type and displays the input image and the extracted composition information.

* * * * *

UNITED STATES PATENT AND TRADEMARK OFFICE
CERTIFICATE OF CORRECTION

| | | |
|---|---|---|
| PATENT NO. | : 8,582,891 B2 | Page 1 of 1 |
| APPLICATION NO. | : 12/822344 | |
| DATED | : November 12, 2013 | |
| INVENTOR(S) | : Hyun-ock Yim et al. | |

It is certified that error appears in the above-identified patent and that said Letters Patent is hereby corrected as shown below:

IN THE CLAIMS:

In Claim 12, Column 11, line 6, replace "the determined the scene type" with -- the determined scene type --.

In Claim 14, Column 11, line 29, replace "the recognized scene from compositions" with -- the determined scene type from compositions --.

Signed and Sealed this
Twenty-eighth Day of October, 2014

Michelle K. Lee
*Deputy Director of the United States Patent and Trademark Office*